US011972061B2

United States Patent
Takashima et al.

(10) Patent No.: US 11,972,061 B2
(45) Date of Patent: Apr. 30, 2024

(54) INPUT APPARATUS, INPUT METHOD, AND RECORDING MEDIUM WITH INPUT PROGRAM RECORDED THEREIN

(71) Applicant: SHARP KABUSHIKI KAISHA, Sakai (JP)

(72) Inventors: Masahiko Takashima, Sakai (JP); Teruhiko Matsuoka, Sakai (JP); Tomoya Ishikura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/138,025

(22) Filed: Apr. 21, 2023

(65) Prior Publication Data

US 2023/0341945 A1 Oct. 26, 2023

(30) Foreign Application Priority Data

Apr. 25, 2022 (JP) ................................. 2022-071419

(51) Int. Cl.
| | | |
|---|---|---|
| *G06F 3/01* | (2006.01) | |
| *G06T 7/20* | (2017.01) | |
| *G06V 10/74* | (2022.01) | |
| *G06V 40/10* | (2022.01) | |
| *G06V 40/20* | (2022.01) | |

(52) U.S. Cl.
CPC ............... *G06F 3/017* (2013.01); *G06T 7/20* (2013.01); *G06V 10/761* (2022.01); *G06V 40/10* (2022.01); *G06V 40/28* (2022.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 8,994,718 B2* | 3/2015 | Latta | ...................... | G06F 3/0485 345/419 |
| 2013/0229345 A1* | 9/2013 | Day | ........................ | G06F 3/017 345/158 |
| 2013/0278493 A1* | 10/2013 | Wei | ......................... | G06F 3/005 382/106 |
| 2019/0188865 A1* | 6/2019 | Du | .......................... | G06T 7/248 |

FOREIGN PATENT DOCUMENTS

JP 2019-519049 A 7/2019

* cited by examiner

*Primary Examiner* — Tuan S Nguyen
(74) *Attorney, Agent, or Firm* — ScienBiziP, P.C.

(57) ABSTRACT

To provide an input apparatus including an acquisition circuit that acquires a captured image capturing a user, a detection circuit that detects a first hand of the user from the captured image acquired by the acquisition circuit, and a display circuit that displays, when a second hand different from the first hand is detected during tracking of the first hand detected by the detection circuit, notification information corresponding to a distance between the first hand and the second hand on the display screen.

10 Claims, 9 Drawing Sheets

INPUT APPARATUS, INPUT METHOD, AND RECORDING MEDIUM WITH INPUT PROGRAM RECORDED THEREIN

INCORPORATION BY REFERENCE

This application is based upon and claims the benefit of priority from the corresponding Japanese Patent Application No. 2022-071419 filed on Apr. 25, 2022, the entire contents of which are incorporated herein by reference.

BACKGROUND

The present disclosure relates to an input apparatus, an input method, and a recording medium with an input program recorded therein, by which it is possible to detect a gesture operation made by a hand of a user to perform input processing on an input position of a display screen.

There is known an input apparatus in which an input by a gesture operation may be performed on a display screen of a display panel (screen operation). For example, an apparatus is known that detects a hand of a user from a captured image capturing the user, tracks the detected hand, and detects an input operation by the hand of the user within a virtual space.

Here, for example, if a left hand of the user is detected to be tracked, when a right hand approaches the left hand or the left and right hands overlap, a tracking target may possibly change from the left hand to the right hand. When the tracking target changes, there is a problem that an unintended operation of the user is input.

SUMMARY

An object of the present disclosure is to provide an input apparatus, an input method, and a recording medium with an input program recorded therein, by which it is possible to prevent an unintended operation from being input by a user in the input apparatus for detecting a gesture operation of the user to perform input processing on an input position of a display screen.

An input apparatus according to one aspect of the present disclosure is an input apparatus for detecting a gesture operation made by a hand of a user to perform input processing on an input position of a display screen. The input apparatus includes an acquisition circuit that acquires a captured image obtained by capturing the user, a detection circuit that detects a first hand of the user from the captured image acquired by the acquisition circuit, and a display circuit that displays, on the display screen, notification information corresponding to a distance between the first hand and a second hand different from the first hand, when the second hand is detected during tracking of the first hand detected by the detection circuit.

An input method according to another aspect of the present disclosure is an input method of detecting a gesture operation made by a hand of a user to perform input processing on an input position of a display screen. In the input method, one or more processors execute acquiring a captured image obtained by capturing the user, detecting a first hand of the user from the captured image acquired, and displaying, on the display screen, notification information corresponding to a distance between the first hand and a second hand different from the first hand, when the second hand is detected during tracking of the first hand detected.

A recording medium according to another aspect of the present disclosure is a recording medium having recorded therein an input program for detecting a gesture operation made by a hand of a user to perform input processing on an input position of a display screen. The input program is a program for causing one or more processors to execute acquiring a captured image obtained by capturing the user, detecting a first hand of the user from the captured image acquired, and displaying, on the display screen, notification information corresponding to a distance between the first hand and a second hand different from the first hand, when the second hand is detected during tracking of the first hand detected.

According to the present disclosure, it is possible to provide an input apparatus, an input method, and a recording medium with an input program recorded therein, by which it is possible to prevent an unintended operation from being input by a user in the input apparatus for detecting a gesture operation of the user to perform input processing on an input position of a display screen.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

An embodiment of the present disclosure will be described below with reference to the attached drawings. The following embodiment is an example in which the present disclosure is embodied, and does not intend to limit the technical scope of the present disclosure.

First Embodiment

Figure 1:
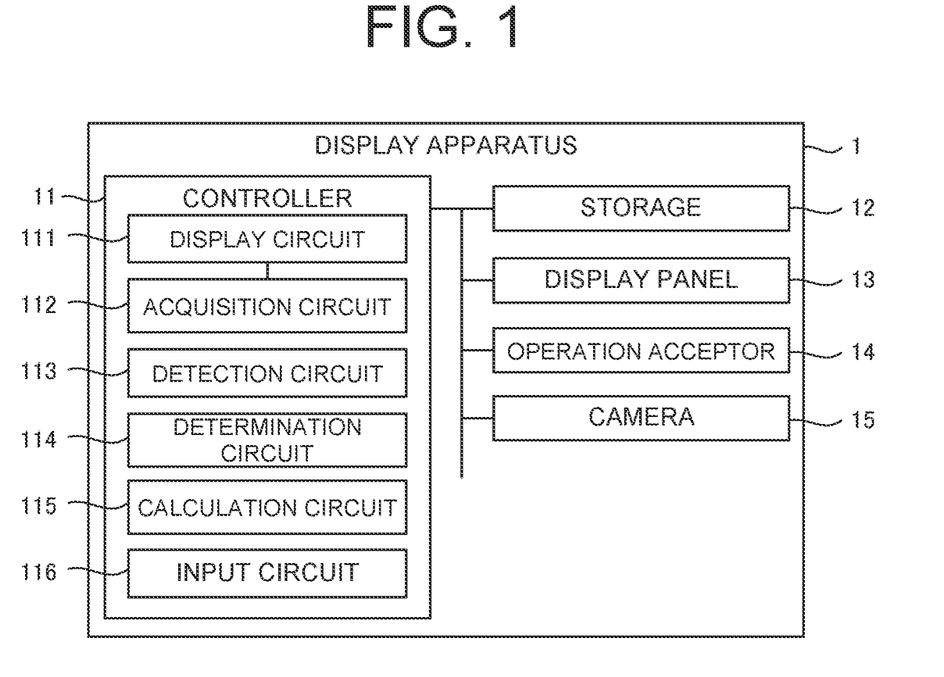
FIG. 1 is a block diagram illustrating a configuration of a display apparatus according to an embodiment of the present disclosure.
Figure 2:
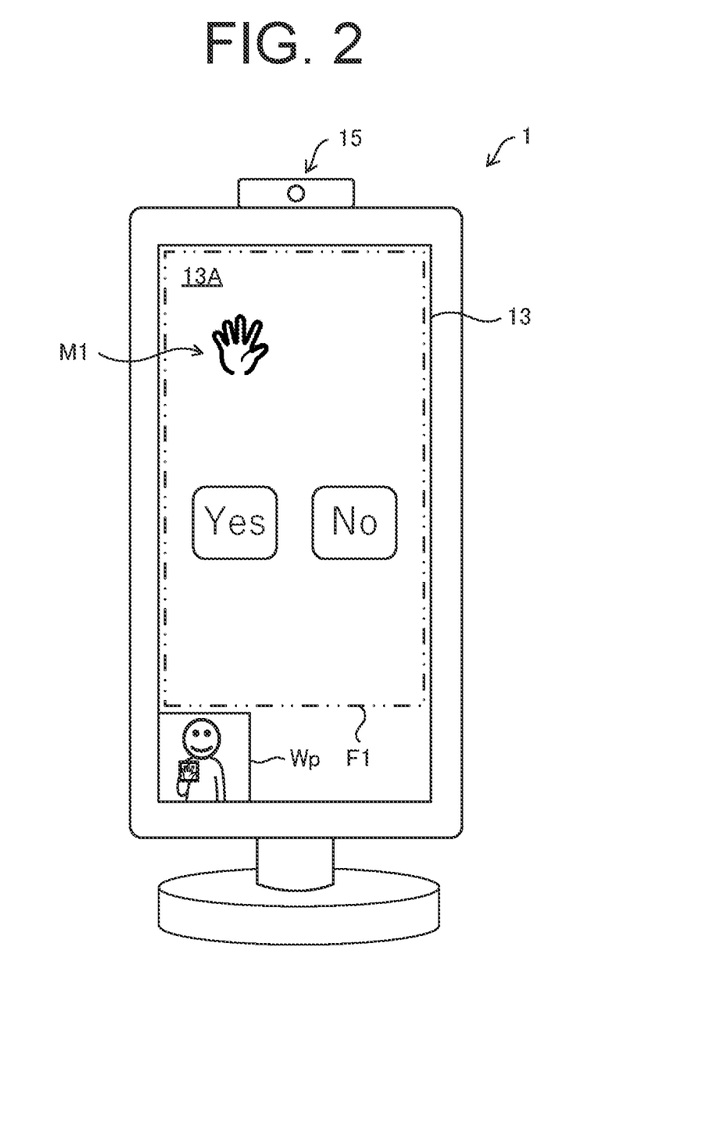
FIG. 2 is a schematic diagram illustrating an example of a display screen in the display apparatus according to an embodiment of the present disclosure.

A display apparatus 1 is an input apparatus for detecting a gesture operation made by a hand of a user to perform input processing on an input position in a display screen. As illustrated in FIG. 1, the display apparatus 1 according to a first embodiment of the present disclosure includes a controller 11, a storage 12, a display panel 13, an operation acceptor 14, and a camera 15. FIG. 2 illustrates a schematic diagram of the display apparatus 1. The camera 15 is installed above the display panel 13 and captures an image of a predetermined area in front of the display panel 13. The display apparatus 1 is an example of an input apparatus according to the present disclosure. The input apparatus according to the present disclosure is not limited to a display apparatus, and may be an information processing apparatus such as a server capable of data communication with the display panel 13 and the camera 15.

The display apparatus 1 receives a non-contact user input operation on a display screen 13A. For example, in detecting an input operation (gesture operation) through a gesture of a user in front of the camera 15, the display apparatus 1 executes input processing according to the user input operation on the display screen 13A. For example, if the user moves his or her hand in front of the camera 15 up, down, left, and right, the display apparatus 1 tracks the recognized hand and moves a position of a mouse cursor M1 on the display screen 13A. Further, if the user closes his or her hand in front of the camera 15 (in a hand shape of "rock"), the display apparatus 1 receives a touch input (for example, a selection operation of "Yes" and "No" buttons) at a position of the mouse cursor M1 on the display screen 13A. A specific configuration of the display apparatus 1 will be described below.

The camera 15 is a digital camera that captures an image of a subject to output the image as digital image data. The camera 15 captures an image at a predetermined frame rate and sequentially outputs the digital image data to the controller 11. The camera 15 may include the camera 15 and a plurality of the cameras 15. Specifically, the camera 15 is installed above the display panel 13 and captures an image of a predetermined area in front of the display panel 13.

The display panel 13 is a display that displays an image on the display screen 13A, and is, for example, a liquid crystal display. The operation acceptor 14 is an operation device such as a mouse and a keyboard. It is noted that the operation acceptor 14 may include a touch panel.

Figure 3A:
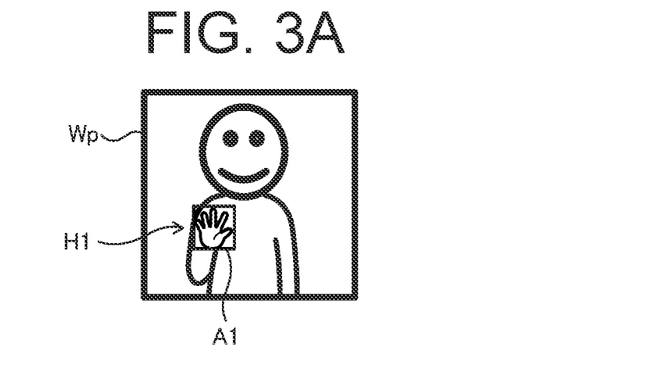
FIG. 3A is a diagram illustrating an example of a captured image displayed in the display apparatus according to an embodiment of the present disclosure.
Figure 3B:
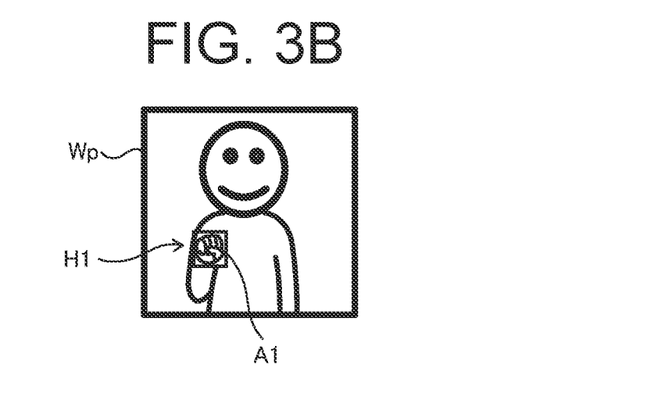
FIG. 3B is a diagram illustrating an example of a captured image displayed in the display apparatus according to an embodiment of the present disclosure.

The display panel 13 displays various types of images according to an instruction from the controller 11. For example, as illustrated in FIG. 2, the display panel 13 displays the mouse cursor M1 that moves following a hand of the user, an operation button through which a touch input is received in response to a predetermined gesture operation made by a hand of the user (a "Yes" button and a "No" button here), a captured image Wp (wipe screen) captured by the camera 15, and the like. FIG. 3A and FIG. 3B illustrate an enlarged views of the captured image Wp. In the captured image Wp, a frame image A1 representing an outer frame of a rectangular area surrounding a hand of the user, is displayed. While viewing the captured image Wp displayed on the display screen 13A, the user moves the position of the mouse cursor M1, and selects (clicks) the operation button with the mouse cursor M1, for example. For example, the user moves the position of the mouse cursor M1 by moving the hand of the user with the hand of the user open (in a hand shape of "paper") (see FIG. 3A), and when the mouse cursor M1 is positioned over the "Yes" button, closes the hand of the user (in a hand shape of "rock") to select (click) the "Yes" button (see FIG. 3B). The frame image A1 is an example of a first image of the present disclosure.

The storage 12 is a non-volatile storage including a hard disk drive (HDD) or a solid state drive (SSD) that stores various types of information. The storage 12 stores a control program such as a display control program for causing the controller 11 to execute display control processing (see FIG. 6, and the like) described later. For example, the display control program may also be recorded non-temporarily on a computer-readable recording medium such as a CD or a DVD, and may be read by a reading device (not illustrated) such as a CD drive or a DVD drive mounted in the display apparatus 1 to be stored in the storage 12. It is noted that the display control program may be distributed from a cloud server to be stored in the storage 12.

The controller 11 includes a control device such as a CPU, a ROM, and a RAM. The CPU is a processor that executes various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (work area) for various types of processes executed by the CPU. The controller 11 controls the display apparatus 1 by causing the CPU to execute various types of control programs stored in advance in the ROM or the storage 12.

Incidentally, in the conventional technology, for example, if a left hand of the user is detected to be tracked, when a right hand approaches the left hand or the left and right hands overlap, a tracking target may possibly change from the left hand to the right hand. When the tracking target changes, there is a problem that an unintended operation of the user is input. A specific example of this problem will be described below.

Figure 4:
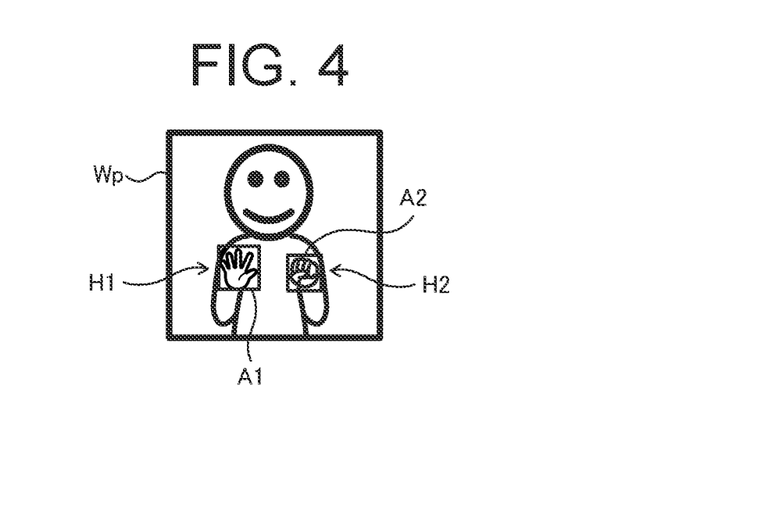
FIG. 4 is a diagram illustrating an example of a captured image displayed in the display apparatus according to an embodiment of the present disclosure.

FIG. 3A illustrates the frame image A1 displayed if a left hand H1 of the user is detected. If the left hand H1 of the user is tracked, when a right hand H2 of the user is detected, as illustrated in FIG. 4, a frame image A2 surrounding the right hand H2 is displayed. FIG. 4 illustrates a state where the right hand H2 is closed (in a hand shape of "rock"), but the shape of the hand is not limited here.

Here, if the right hand H2 of the user approaches or overlaps the left hand H1, the tracking target may possibly change from the left hand H1 to the right hand H2. For example, if the user makes a gesture such as a behavior to operate a mobile phone with the right hand H2 and a behavior to touch a face or a hair with the right hand H2, the right hand H2 approaches or overlaps the left hand H1. If the tracking target changes to the right hand H2, there occurs a problem that an unintended user operation is input such as the position of the mouse cursor M1 moving according to the behavior of the right hand H2 and a touch input being performed.

On the other hand, in the display apparatus 1 according to the present embodiment, as described below, it is possible to prevent an unintended user operation from being input.

Specifically, as illustrated in FIG. 1, the controller 11 includes various types of circuits such as a display circuit 111, an acquisition circuit 112, a detection circuit 113, a determination circuit 114, a calculation circuit 115, and an input circuit 116. The controller 11 functions as each circuit by causing the CPU to execute various types of processing according to the display control programs. Some or all of the processing circuits included in the controller 11 may include an electronic circuit. It is noted that the display control program may be a program for causing a plurality of processors to function as the various types of processing operators.

The display circuit 111 displays various types of information on the display panel 13. The display circuit 111 displays various types of images according to the execution of various types of applications. For example, the display circuit 111 displays the display screen 13A illustrated in FIG. 2 on the display panel 13. The display circuit 111 displays the captured image Wp at an end (corner) of the display screen 13A. The captured image Wp is a partial image of a specific range including a detected face image of the user, in a captured image of a predetermined area captured by the camera 15. The display circuit 111 updates in real time the captured image Wp according to the captured image acquired from the camera 15. It is noted that the display position of the captured image Wp is not limited. The display circuit 111 may display the captured image Wp on condition that a face or a hand of the user is detected.

The display circuit 111 displays the mouse cursor M1 within an enterable area F1 set inside by a predetermined width from a lower end of the display screen 13A. The predetermined width is set, for example, to a vertical width of the captured image Wp. The user is capable of moving the mouse cursor M1 within the enterable area F1. A shape of the mouse cursor M1 is not limited to a shape of a hand, and may be a shape of an arrow. The display circuit 111 is an example of a display circuit according to the present disclosure.

The acquisition circuit 112 acquires a captured image obtained by capturing the user. Specifically, the acquisition circuit 112 sequentially acquires, from the camera 15, digital image data of an image captured by the camera 15 at a predetermined frame rate. The acquisition circuit 112 is an example of an acquisition circuit according to the present disclosure.

The detection circuit 113 detects a user (for example, a face) from the captured image acquired by the acquisition circuit 112. The detection circuit 113 detects the hand of the user from the captured image. It is possible to apply a well-known method to a method of detecting the face and the hand of the user. For example, the detection circuit 113 executes processing including cropping, resizing, inversion, and rotation on the digital image data to detect the face and the hand of the user. In detecting the hand, the detection circuit 113 tracks movement of the hand. The detection circuit 113 is an example of a detection circuit according to the present disclosure.

The determination circuit 114 determines the shape of a hand of the user detected by the detection circuit 113. For example, the determination circuit 114 determines whether a hand of the user is open (in a hand shape of "paper") (see FIG. 3A) or closed (in a hand shape of "rock") (see FIG. 3B). The determination circuit 114 determines whether a hand of the user detected by the detection circuit 113 is a right hand or a left hand.

Here, the detection circuit 113 detects the hand from a frame of the image, and based on the position of the detected hand and the shape of the hand determined by the determination circuit 114, selects a tracking result in a current frame (hand corresponding to a current frame) following tracking results in all of preceding frames (hands detected in all of preceding frames). The detection circuit 113 tracks the hand by repeating this processing. It is possible to apply a well-known technique to the tracking.

For example, the detection circuit 113 detects one or more detected changes in hands for a frame extracted at predetermined time intervals, and determines a hand having at least the largest amount of movement or the largest size as the hand to be tracked.

When the detection circuit 113 detects the hand of the user, the display circuit 111 displays the frame image A1 surrounding the hand in the captured image Wp. For example, as illustrated in FIG. 3A, when the detection circuit 113 detects the left hand H1 of the user, the display circuit 111 displays the frame image A1 surrounding the left hand H1 to be superimposed on the captured image Wp. The display circuit 111 displays the frame image A1 in the captured image Wp in a first display manner (for example, in a red or solid line).

If the second hand different from the first hand is detected when the first hand detected by the detection circuit 113 is being tracked, the calculation circuit 115 calculates the distance L1 between the first hand and the second hand. For example, if the left hand H1 of the user and the right hand H2 thereof are detected by the detection circuit 113, the calculation circuit 115 calculates the distance L1 between the left hand H1 and the right hand H2. Specifically, if the detection circuit 113 detects the left hand H1 of the user to be tracked (see FIG. 3A), when the detection circuit 113 further detects the right hand H2 of the user (see FIG. 4), the calculation circuit 115 calculates the distance L1 between the left hand H1 and the right hand H2. The distance L1 may be the shortest distance between the left hand H1 and the right hand H2, or may be a distance (distance between the centers) between the center (center of gravity) of the left hand H1 and the center (center of gravity) of the right hand H2 (center distance). The calculation circuit 115 is an example of a calculation circuit according to the present disclosure.

Here, the display circuit 111 displays the frame image A2 of the right hand H2 in the captured image Wp according to the distance L1. Specifically, if the right hand H2 is detected while the operation-side hand (left hand H1) detected by the detection circuit 113 is tracked, the display circuit 111 displays the notification information according to the distance L1 between the left hand H1 and the right hand H2, on the display screen 13A.

The display circuit 111 displays the captured image Wp on the display screen 13A, displays the frame image A1 surrounding the left hand H1 to be superimposed on the captured image Wp, and displays the frame image A2 surrounding the right hand H2 to be superimposed on the captured image Wp in a display manner according to the distance L1. For example, the display circuit 111 changes the display manner of the frame image A2 according to the distance L1 to display such a frame image A2 in the captured image Wp. For example, to call the user's attention when the right hand H2 which is not to be operated, approaches the left hand H1, the display circuit 111 changes the display manner so that the frame image A2 strands out. The frame image A2 is an example of a second image according to the present disclosure.

Figure 5A:
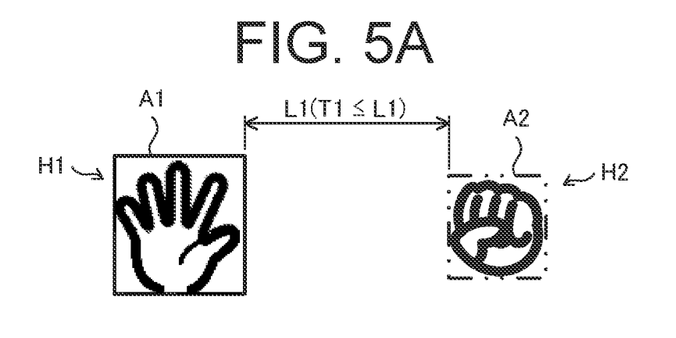
FIG. 5A is a diagram illustrating an example of notification information displayed in the display apparatus according to a first embodiment of the present disclosure.
Figure 5B:
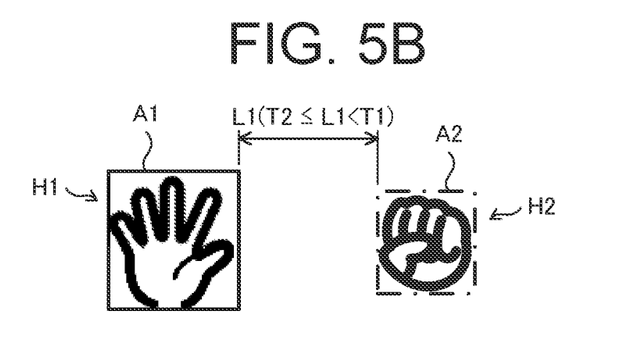
FIG. 5B is a diagram illustrating an example of the notification information displayed in the display apparatus according to the first embodiment of the present disclosure.

For example, as illustrated in FIG. 5A, if the distance L1 is equal to or more than a first threshold value T1, the display circuit 111 displays the frame image A2 to be superimposed on the captured image Wp in a second display manner (for example, in a blue or two-dot chain line). For example, as illustrated in FIG. 5B, if the distance L1 is equal to or more than a second threshold value T2 and less than the first threshold value T1, the display circuit 111 displays the frame image A2 to be superimposed on the captured image Wp in a third display manner (for example, in a green or dashed line).

Figure 5C:
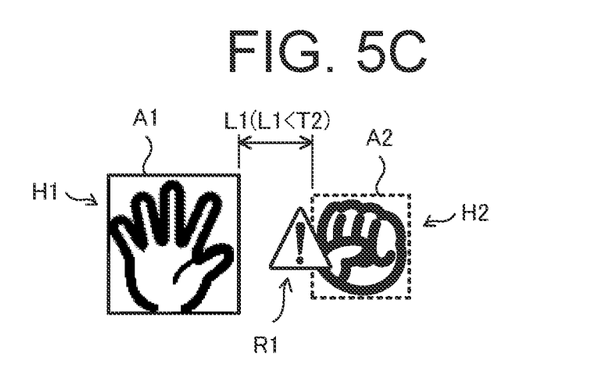
FIG. 5C is a diagram illustrating an example of the notification information displayed in the display apparatus according to the first embodiment of the present disclosure.

For example, as illustrated in FIG. 5C, if the distance L1 is less than the second threshold value T2, the display circuit 111 displays the frame image A2 to be superimposed on the captured image Wp in a fourth display manner (for example, in a yellow or dotted line). If the distance L1 is less than the second threshold value T2, to further call the user's attention, the display circuit 111 displays a warning image R1 near the frame image A2. The display circuit 111 may display with blinking so that the warning image R1 stands out.

In this manner, the display circuit 111 displays the frame image A1 to be superimposed on the captured image Wp in the first display manner, and displays the frame image A2 according to the distance to be superimposed on the captured image Wp in a display manner different from the first display manner. If the distance L1 is equal to or more than the first threshold value T1, the display circuit 111 displays the frame image A2 to be superimposed on the captured image Wp in the second display manner, if the distance L1 is equal to or more than the second threshold value T2 and less than the first threshold value T1, displays the frame image A2 to be superimposed on the captured image Wp in the third display manner, and if the distance L1 is less than the second threshold value T2, displays the frame image A2 to be superimposed on the captured image Wp in the fourth display manner.

This allows the user to understand at a glance that the operating-side tracking target changes to the right hand H2 due to the right hand H2 approaching the left hand H1 to be operated and the right hand H2 approaching the left hand H1.

It is noted that the controller 11 may output a warning sound according to the distance L1. For example, the controller 11 may increase the volume of the warning sound as the distance L1 is shorter.

The input circuit 116 executes input processing on the input position corresponding to the hand of the user. Specifically, if the shape of the hand of the user detected by the detection circuit 113 is a shape where the hand is open, the input circuit 116 executes processing for moving the mouse cursor M1 displayed on the display screen 13A, depending on the movement of a reference point (for example, a center point) of the hand. If the shape of the hand of the user detected by the detection circuit 113 changes from an opened hand to a closed hand, the input circuit 116 executes processing for selecting a selection target (for example, the "Yes" button or the "No" button in FIG. 2) at a display position of the mouse cursor M1 corresponding to the reference point.

Display Control Processing

Display control processing executed by the controller 11 of the display apparatus 1 will be described below with reference to FIG. 6.

The present disclosure can be regarded as a disclosure of a display control method (an example of an input method according to the present disclosure) of executing one or more steps included in the display control processing, and one or more steps included in the display control processing described here may be omitted where appropriate. Each of the steps in the display control processing may be executed in a different order as long as a similar operation and effect is obtained. Here, a case where each of the steps in the display control processing executed by the controller 11 is described by way of example. However, a display control method in which a plurality of processors execute each of the steps in the display control processing in a disperse manner, may also regarded as another embodiment.

Firstly, in step S1, the controller 11 determines whether the captured image is acquired from the camera 15. In acquiring the captured image from the camera 15 (S1: Yes), the controller 11 advances the processing to step S2. The controller 11 waits until the captured image is acquired (S1: No).

In step S2, the controller 11 determines whether the hand of the user is detected. In detecting the hand of the user (S2: Yes), the controller 11 advances the processing to step S3. On the other hand, if the hand of the user is not detected (S2: No), the controller 11 advances the processing to step S1. It is noted that the controller 11 may execute face detection processing in step S2 or a subsequent step.

In step S3, the controller 11 determines whether an operation mode is entered. In determining that the operation mode is entered (S3: Yes), the controller 11 advances the processing to step S4. On the other hand, if determining that the operation mode is not entered (S3: No), the controller 11 advances the processing to step S1.

For example, if detecting the hand at the same position a predetermined number of times (Nth, 0<Nth≤N1) or more, in a plurality of immediately preceding frames (N1), the controller 11 determines that the operation is well prepared and enters the operation mode. It is noted that the detected positions of the hand may not match completely, and the controller 11 may consider that the hand is "detected at the same position" if an amount of movement of a plurality of detected positions is equal to or less than a predetermined value.

If detecting a plurality of hands at the same time, the controller 11 selects one representative hand in each frame, and determines whether such a representative hand satisfies the above condition. For example, the controller 11 may select, as the representative hand, a hand having the highest score when the hand is detected, or a hand having the largest detected size (that is, a hand possibly detected at the nearest position).

The controller 11 may narrow down the detection positions of the hand to within a specific range at the stage of determining whether the operation mode is to be entered. For example, in detecting a face, the controller 11 may set predetermined ranges including an area near a lower end and left and right both sides of the face so that the hand is hovered within such predetermined ranges. The controller 11 may prevent an erroneous input that may occur due to information on a hand or a face of a person simply passing by, by asking the user to naturally hover his or her hand to near his or her face, as a sign to start the operation. In particular, if the detection range is not specified according to the position of the face, and if the information on the face is not used even at a later stage, the controller 11 may omit the face detection processing.

If the face information is used only as a condition for transitioning to the operation mode, the controller 11 may omit the face detection processing during the operation mode. In this way, the user may perform the operation of hovering the hand until the current mode is transitioned to the operation mode.

In step S3, the controller 11 may further perform cancellation determination of whether to cancel the operation mode. For example, the controller 11 cancels the operation mode if the tracking of the hand being operated during the operation mode fails continuously for a predetermined time period (number of frames) or more.

It is noted that it is desirable to set the predetermined time period to be moderately long (for example, three seconds). Such a setting is employed because if an operation by a hand gesture continues for a long time, the user feels tired and may take a movement different from a movement for an operation such as temporarily lowering the hand during the operation, and as a result, if the predetermined time period is too short, the operation mode is frequently canceled, and therefore, convenience is reduced. When the predetermined time period is set to be longer, even if the operation is temporarily interrupted and the tracking is interrupted, it is possible to resume the tracking if the tracking is started again, and thus, the convenience is improved.

In step S4, the controller 11 displays the captured image Wp (wipe screen) on the display screen 13A. Specifically, the controller 11 displays a partial image (captured image Wp) in a specific range including a detected face and hand of the user, in the captured image in a predetermined area captured by the camera 15, at an end (corner) of the display screen 13A (see FIG. 2). The controller 11 displays the frame image A1 surrounding a hand of the user to be superimposed on the captured image Wp (see FIG. 3A). It is noted that the controller 11 may execute the processing of displaying the captured image Wp on the display screen 13A, for example, between steps S1 and S2.

In detecting a hand of the user (left hand H1 in FIG. 3A), the controller 11 tracks the left hand H1 and moves the frame image A1 within the captured image Wp in accordance with the movement of the left hand H1.

Next, in step S5, the controller 11 determines whether a hand different from the hand which is the tracking target (operating side) is detected. In the above example, the controller 11 determines whether the right hand H2 is detected while the left hand H1 is being tracked (see FIG. 3A). If the other hand different from the hand to be tracked is detected (S5: Yes), the controller 11 advances the processing to step S6. On the other hand, if the other hand different from the hand to be tracked is not detected (S5: No), the controller 11 advances the processing to step S8.

In detecting the other hand (right hand H2) different from the hand to be tracked, the controller 11 displays the frame image A2 surrounding the right hand H2 to be superimposed on the captured image Wp (see FIG. 4).

It is noted that the other hand is not limited to the hand of the same user as the user having the hand to be tracked. For example, in step S5, if a hand (a left hand or a right hand) of another user Y is detected while the left hand H1 of a user X is being tracked, the controller 11 advances the processing to step S6.

In step S6, the controller 11 calculates the distance L1 between the hand to be tracked and the other hand different from such a hand. For example, the controller 11 calculates the distance L1 between the left hand H1 to be tracked and the right hand H2 detected while the left hand H1 is being tracked.

Next, in step S7, the controller 11 executes display processing according to the calculated distance L1.

For example, as illustrated in FIG. 5A, if the calculated distance L1 is equal to or more than the first threshold value T1, the controller 11 superimposes and displays the frame image A2 corresponding to the right hand H2 to be superimposed on the captured image Wp in the second display manner (for example, in blue).

Further, for example, as illustrated in FIG. 5B, if the distance L1 is equal to or more than the second threshold value T2 and less than the first threshold value T1, the controller 11 displays the frame image A2 to be superimposed on the captured image Wp in the third display manner (for example, in green).

For example, as illustrated in FIG. 5C, if the distance L1 is less than the second threshold value T2, the controller 11 displays the frame image A2 to be superimposed on the captured image Wp in the fourth display manner (for example, in yellow). If the distance L1 is less than the second threshold value T2, the controller 11 displays the warning image R1 near the frame image A2.

When such display processing makes the user to comprehend that the right hand H2 approaches the left hand H1 to be tracked, the user performs a behavior in which the right hand H2 is moved away from the left hand H1.

Next, in step S8, the controller 11 executes input processing, based on the input position. Specifically, the controller 11 calculates a position (input position) of a reference point (for example, a center point) of the hand, and executes movement processing for moving the mouse cursor M1 displayed on the display screen 13A according to the movement of the hand. If the shape of a hand of the user changes from the open state (hand shape of "paper") to the closed state (hand shape of "rock"), the controller 11 executes selection processing for selecting a target to be selected (for example, the "Yes" button or the "No" button in FIG. 2) at the display position of the mouse cursor M1 corresponding to such a reference point. For example, when the input position is placed on the "Yes" button and the user performs a behavior to close his or her hand with the mouse cursor M1 being placed on the "Yes" button, the controller 11 accepts the "Yes" button operation to execute predetermined processing.

In step S9, the controller 11 determines whether the user input operation is ended. If such input operation is ended (S9: Yes), the controller 11 ends such display control processing. If the input operation is not ended (S9: No), the controller 11 returns to step S1. As described above, the controller 11 executes the display control processing.

As described above, the display apparatus 1 according to the present embodiment is an apparatus for detecting a gesture operation made by a hand of a user to perform input processing on an input position in a display screen. The display apparatus 1 acquires the captured image obtained by capturing the user, and detects the first hand of the user from the acquired captured image. The display apparatus 1 displays, if a second hand different from the first hand is detected while the detected first hand is being tracked, the notification information corresponding to the distance between the first hand and the second hand, on the display screen 13A.

According to the above configuration, in a system in which an operator (user) controls the mouse with a hand gesture operation while such an operator looks at him or herself captured by the camera, when a display having a high visual attraction is applied to a hand moving for the operation (operation-side hand) as another hand different from such a hand is approaching, the operator is visually notified of a possible confusion between the operation-side hand and the other hand. As a result, when the user is alerted to a movement that may possibly lead to a malfunction, the user is more aware of such a movement, and thus, when the user is captured from the front, it is possible to suppress a malfunction, even in an environment where another hand other than the operation-side hand may possibly be displayed.

As another embodiment, in detecting the operation-side hand to track the hand, the controller 11 may issue a warning display after canceling the start of the tracking if another hand is detected within a predetermined time period.

When either the operation-side hand or the other hand cannot be detected and a predetermined time passes, the controller 11 may delete the corresponding frame image from the display screen 13A.

Second Embodiment

A second embodiment of the present disclosure will be described below. The same configuration as that in the first embodiment will not be described here where appropriate.

Figure 7:
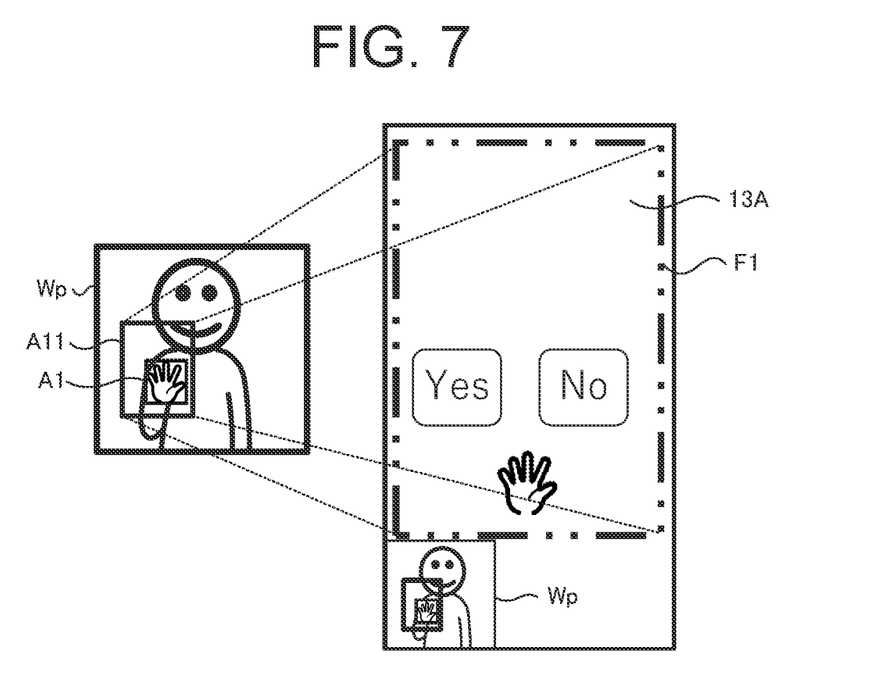
FIG. 7 is a schematic diagram illustrating an example of a method for detecting an input position in a display apparatus according to a second embodiment of the present disclosure.

FIG. 7 is a schematic diagram illustrating an example of a method for detecting an input position in the display apparatus 1 according to the second embodiment. In the display apparatus 1 according to the second embodiment, the controller 11 sets an operation frame image A11 corresponding to an area to be operated (operation area) in the area of the captured image Wp. Such an operation area is an area in which an input operation (touch operation) and an operation for moving the mouse cursor M1 in the enterable area F1 are acceptable.

Specifically, as illustrated in FIG. 7, the display circuit 111 displays the operation frame image A11 corresponding to an outer frame of the operation area within the captured image Wp. The input circuit 116 calculates a position, within the enterable area F1, corresponding to the position within the operation frame image A11 corresponding to the reference point (for example, a center point of the hand), as such an input position. Specifically, the input circuit 116 maps the reference point of the operation frame image A11 to the enterable area F1, determines the mapped position as the input position, and displays the mouse cursor M1 at such an input position. According to such a configuration, if the hand of the user is positioned within the area of the operation frame image A11, the mouse cursor M1 moves on the display screen 13A according to the movement of the hand. On the other hand, if the hand of the user is positioned outside the area of the operation frame image A11, the mouse cursor M1 without interlocking with the movement of the hand is fixed at an end of the display screen 13A (near a boundary of the enterable area F1).

It is noted that when mapping the operation frame image A11 and the enterable area F1, the input circuit 116 may map the operation frame image A11 to a virtual enterable area larger than a screen size of the actual display screen 13A.

In the configuration in which the operation frame image A11 is set, when the other hand H2 which is not the hand to be tracked (operating side) (hand H1 illustrated in FIG. 8) is concerned, the calculation circuit 115 calculates each of the distance L1 to the operation-side hand H1 and the distance L2 to the operation frame image A11, selects either the distance L1 or the distance L2, whichever is shorter, and executes the display processing according to the selected distance. The distance L1 is an example of a first distance according to the present disclosure, and the distance L2 is an example of a second distance according to the present disclosure.

Figure 8:
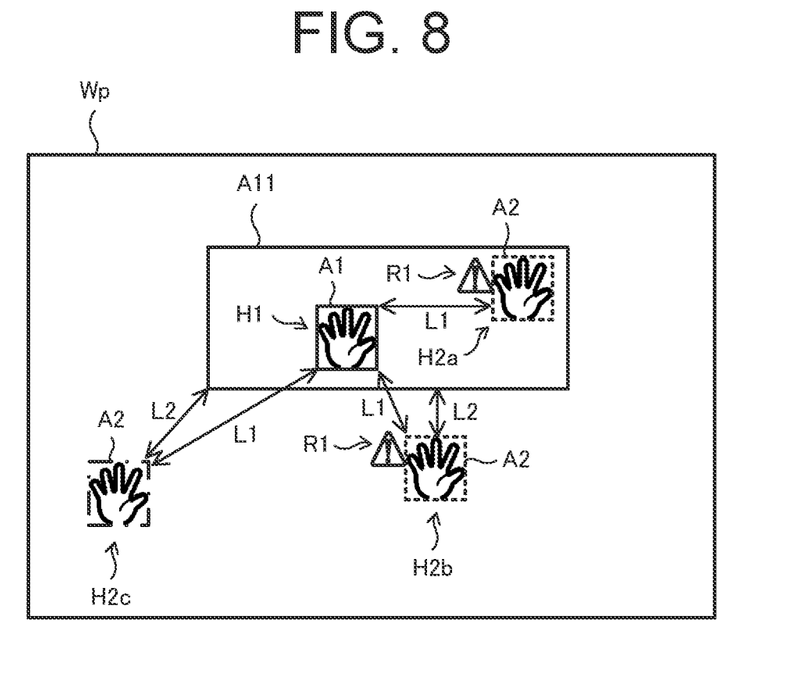
FIG. 8 is a diagram illustrating an example of notification information displayed in the display apparatus according to the second embodiment of the present disclosure.

For example, in FIG. 8, if the detection circuit 113 detects another hand H2c outside of the area of the operation frame image A11 while tracking the operation-side hand H1, the calculation circuit 115 calculates the distance L1 between the hand H2c and the hand H1 and the distance L2 between the hand H2c and the operation frame image A11, to select either the distance L1 or the distance L2, whichever is shorter (here, the distance L2). The display circuit 111 executes the display processing in the first embodiment according to the distance L2. For example, if the distance L2 is equal to or more than the first threshold value T1, the display circuit 111 displays the frame image A2 corresponding to the hand H2c to be superimposed on the captured image Wp in the second display manner (for example, in blue).

For example, in FIG. 8, if the detection circuit 113 detects another hand H2b outside of the area of the operation frame image A11 while tracking the operation-side hand H1, the calculation circuit 115 calculates the distance L1 between the hand H2b and the hand H1 and the distance L2 between the hand H2b and the operation frame image A11 to select the distance L2 which is shorter. If the distance L2 is less than the second threshold value T2, the display circuit 111 displays the frame image A2 to be superimposed on the captured image Wp in the fourth display manner (for example, in yellow). If the distance L2 is less than the second threshold value T2, the display circuit 111 displays the warning image R1 near the frame image A2. As a result, even if there is a distance to the operation-side hand, it is possible to comprehend that a non-operation-side hand approaches the operation area.

For example, in FIG. 8, if the detection circuit 113 detects another hand H2a within the area of the operation frame image A11 while tracking the operation-side hand H1, the calculation circuit 115 calculates regarding the distance L1 and the distance L2 as "0". In this case, the distance L1 and the distance L2 are less than the second threshold value T2, and thus, the display circuit 111 displays the frame image A2 to be superimposed on the captured image Wp in the fourth display manner (for example, in yellow) and displays the warning image R1 near the frame image A2. As a result, it is possible to easily comprehend that a hand not desired to enter the operation area enters the operation area.

Figure 9:
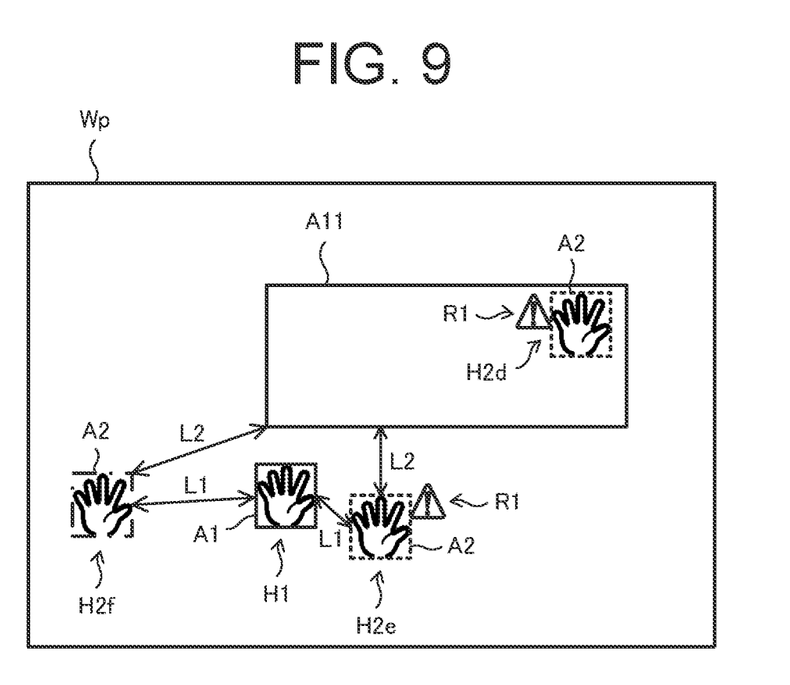
FIG. 9 is a diagram illustrating an example of the notification information displayed on the display apparatus according to the second embodiment of the present disclosure.

FIG. 9 illustrates an example of a case where the operation-side hand H1 is positioned outside of the operation frame image A11.

For example, in FIG. 9, if the detection circuit 113 detects another hand H2f outside of the area of the operation frame image A11 while tracking the operation-side hand H1, the calculation circuit 115 calculates the distance L1 between the hand H2f and the hand H1 and the distance L2 between the hand H2f and the operation frame image A11 to select the distance L1 which is shorter. If the distance L1 is equal to or more than the first threshold value T1, the display circuit 111 displays the frame image A2 corresponding to the hand H2f to be superimposed on the captured image Wp in the second display manner (for example, in blue).

For example, in FIG. 9, if the detection circuit 113 detects another hand H2e outside of the area of the operation frame image A11 while tracking the operation-side hand H1, the calculation circuit 115 calculates the distance L1 between the hand H2e and the hand H1 and the distance L2 between the hand H2e and the operation frame image A11 to select the distance L1 which is shorter. If the distance L1 is less than the second threshold value T2, the display circuit 111 displays the frame image A2 to be superimposed on the captured image Wp in the fourth display manner (for example, in yellow). If the distance L1 is less than the second threshold value T2, the display circuit 111 displays the warning image R1 near the frame image A2.

For example, in FIG. 9, if the detection circuit 113 detects another hand H2d within the area of the operation frame image A11 while tracking the operation-side hand H1, the calculation circuit 115 calculates regarding the distance L1 and the distance L2 as "0". In this case, the distance L1 and the distance L2 are less than the second threshold value T2, and thus, the display circuit 111 displays the frame image A2 to be superimposed on the captured image Wp in the fourth display manner (for example, in yellow) and displays the warning image R1 near the frame image A2. That is, if the other hand which is not the operation-side hand is positioned within the operation area (operation frame image A11), the display circuit 111 displays the warning image R1 near the frame image A2.

In the example illustrated in FIG. 9, if the operation-side (tracking target) hand is positioned outside the area of the operation frame image A11 (outside the operation area), the display circuit 111 may use, for display, a display manner of the frame image A1 corresponding to such a hand, different from the display manner of the case where such a hand is positioned within the area of the operation frame image A11.

In this way, if the operation area (operation frame image A11) capable of receiving the gesture operation is set in the captured image Wp, the display circuit 111 displays the notification information according to the distance L1 between the first hand and the second hand and the distance L2 between the second hand and the operation area, on the display screen 13A. The display circuit 111 displays the frame image A2 to be superimposed on the captured image Wp, in a display manner according to either the distance L1 or the distance L2, whichever is shorter.

Figure 10:
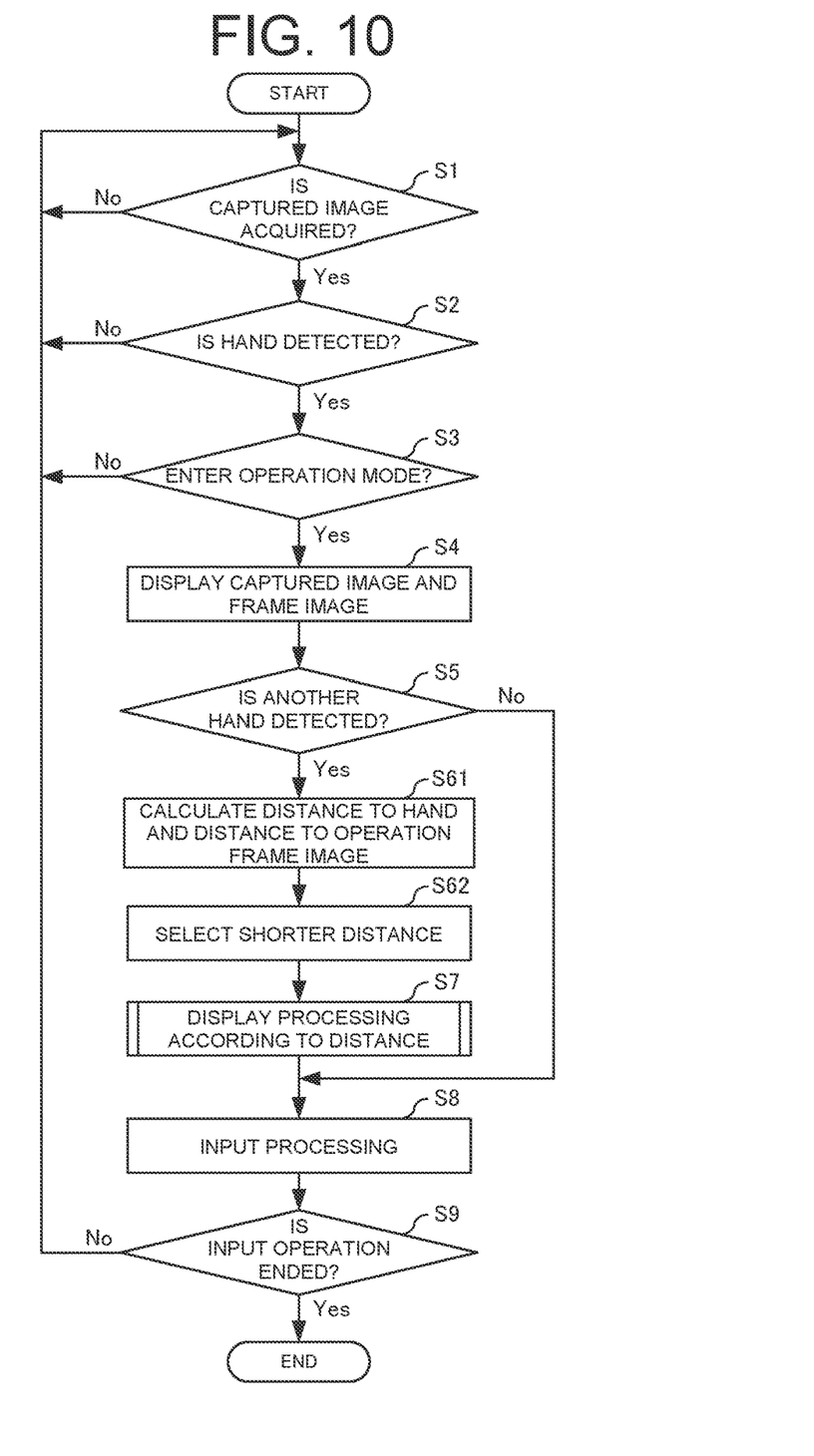
FIG. 10 is a flowchart for explaining an example of a procedure of display control processing executed in the display apparatus according to the second embodiment of the present disclosure.

FIG. 10 is a flowchart for explaining an example of a procedure of the display control processing executed in the controller 11 of the display apparatus 1 according to the second embodiment. Here, the same step numbers are assigned to the same processing as the display control processing (see FIG. 6) according to the first embodiment, and the description thereof is omitted.

Figure 6:
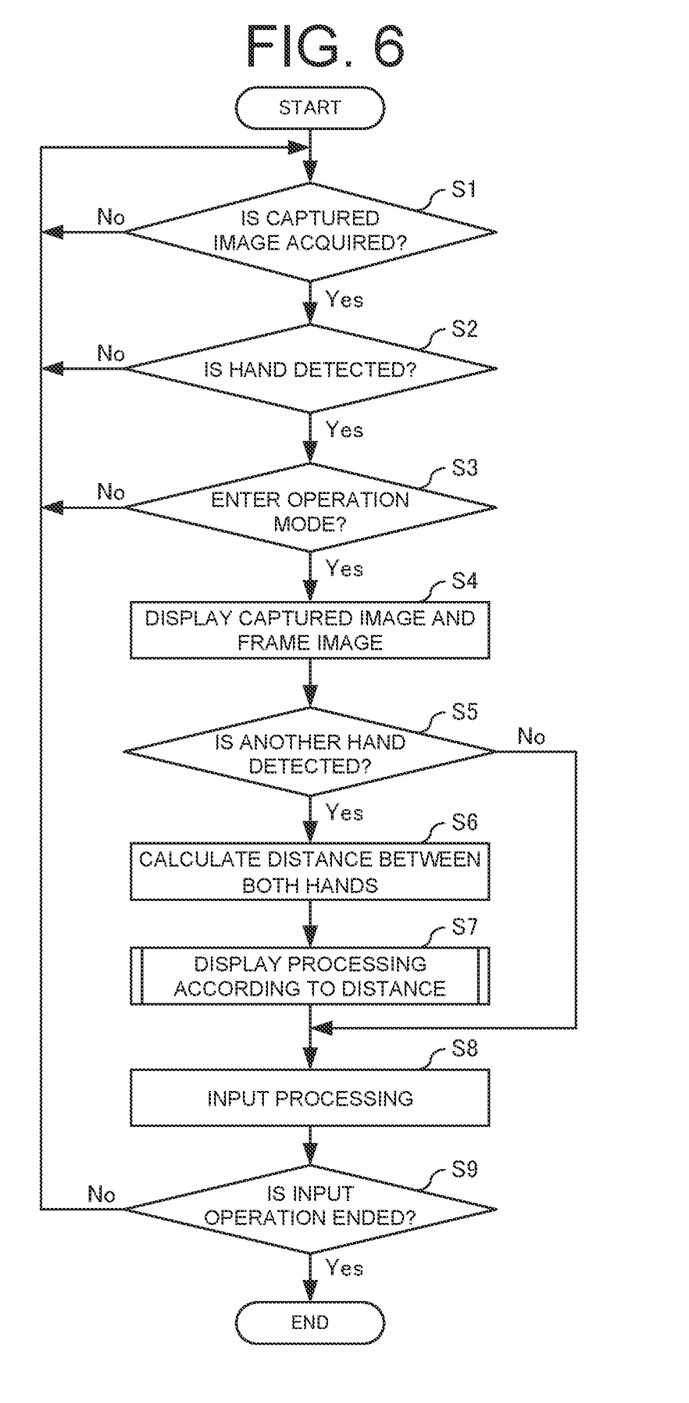
FIG. 6 is a flowchart for explaining an example of a procedure of display control processing executed in the display apparatus according to the first embodiment of the present disclosure.

The display control processing illustrated in FIG. 10 includes steps S61 and S62 not included in the display control processing illustrated in FIG. 6.

In step S61, the controller 11 calculates the distance L1 between the (operation-side) hand H1 to be tracked and the other hand H2 different from the hand H1, and further calculates the distance L2 between the hand H1 and the operation frame image A11 (see FIG. 8 and FIG. 9).

In step S62, the controller 11 selects the distance, either the calculated distance L1 or L2, whichever is shorter. In the example (hands H2b and H2c) illustrated in FIG. 8, the controller 11 selects the distance L2. In the example (hands H2e and H2f) illustrated in FIG. 9, the controller 11 selects the distance L1.

In step S7, the controller 11 executes the display processing according to the selected distance. Specifically, the controller 11 changes, according to the selected distance, the display manner of the frame image A2 corresponding to the hand H2.

In step S8, the controller 11 executes the input processing, based on the input position. Specifically, if the operation-side hand H1 is positioned within the operation area (operation frame image A11) (see FIG. 8), the controller 11 moves the mouse cursor M1 displayed on the display screen 13A, according to the movement of the hand, and if the user performs an operation of closing the hand, accepts the touch operation and executes predetermined processing. If the operation-side hand H1 is positioned outside of the operation area (operation frame image A11) (see FIG. 9), the controller 11 displays the mouse cursor M1 displayed on the display screen 13A in such a manner to be fixed near the boundary of the enterable area F1.

In the second embodiment, if the hand selected as the operation-side hand is the left hand, for example, the operation area (operation frame image A11) is set to the left side of the screen. In determining whether the operation-side hand is the right hand or the left hand, if an image frame is displayed as a mirror image in a horizontally inverted image (horizontal flipped) in advance, the hand detected in the left half of the screen is determined to be the left hand, and if the image frame is not displayed in a horizontally inverted image in advance, the hand detected in the right half of the screen is determined to be the right hand. It is noted that if the face of the user is detected, the controller 11 may determine whether the operation-side hand is the right hand or the left hand, based on whether the position of the operation-side hand is positioned at the right side or the left side from the center position of the detected face. For example, if the image frame is horizontally inverted in advance, the controller 11 determines that the operation-side hand is the left hand, the operation-side hand is detected at the left side from the center position of the detected face.

As described above, the display apparatus 1 according to the second embodiment sets the operation area (operation frame image A11) in the captured image Wp to determine the movement of the hand within the operation area as the operation of the mouse cursor M1 to be displayed. The display apparatus 1 switches methods for calculating a distance depending on whether the hand is inside or outside the operation area. As a result, in a case where the other hand not being the operation-side hand appears within the operation area, such a hand may be easily a cause of a malfunction when the operation-side hand is temporarily lowered and is outside the operation area even if the distance of the other hand not being the operation-side hand to the operation-side hand is far, but when the distance between the other hand and the operation area (operation frame image A11) is considered, it is possible to apply a warning to the user simply by approaching the operation area (operation frame image A11).

Third Embodiment

A third embodiment of the present disclosure will be described below. The same configuration as that in the second embodiment will not be described here where appropriate.

For example, in a normal usage scene of the display apparatus 1, the user should pay attention to a behavior of the other one of the hands, that is, the left hand if the right hand is used for operating, of the operator him/herself that is the other hand not being the operation-side hand. Normally, there is a possibility that the operation-side hand (for example, the right hand) may possibly be lowered and rested during an operation, but there are few opportunities that the operation-side right hand is moved to the opposite side (left side of the user's body).

Therefore, the calculation circuit 115 according to the third embodiment calculates the distance between the operation-side hand and the other hand (hereinafter, the distance D), as described below.

Specifically, the calculation circuit 115 calculates the distance between the both hands by changing the weight for each of distance components in the horizontal direction and the vertical direction in the operation-side hand and the non-operation-side hand. The calculation circuit 115 distinguishes the operation-side hand between the left hand and the right hand, and changes method of calculating a distance between an outer side and an inner side as seen from the operator.

For example, when Dx denotes the distance component in the horizontal direction and Dy denotes the distance component in the vertical direction, the calculation circuit 115 sets a coefficient $\alpha<\beta$ (weighting parameter) in the following formula (1) and calculates a distance D between the operation-side hand and the other hand to prioritize a closeness of the distance in the horizontal direction:

$$D=\sqrt{(\alpha Dx^2+\beta Dy^2)} \quad (1)$$

Figure 11:
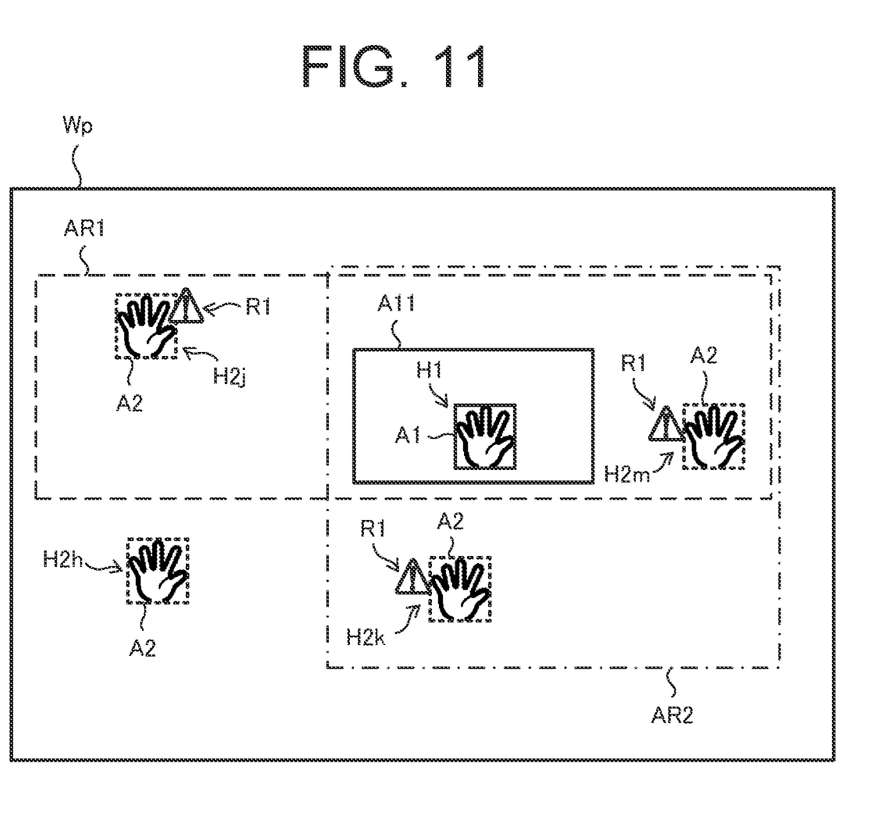
FIG. 11 is a diagram illustrating an example of notification information displayed in the display apparatus according to a third embodiment of the present disclosure.

As another example, if it is determined that the operation-side hand is the right hand, the calculation circuit 115 divides an area, based on a left side and a bottom side of the operation frame image A11, into a first area AR1 (dotted line area in FIG. 11) and a second area AR2 (dashed-dotted line area in FIG. 11), and switches methods for calculating a distance for each area. The first area AR1 is an area above the bottom side (or slightly therebelow) of the operation area (the operation frame image A11), and the second area AR2 is an area to the right of the left side (or slightly left thereof) of the operation area (operation frame image A11).

As a first example, if the detected other hand (non-operation-side hand) is included in an area where the first area AR1 and the second area AR2 overlap (in a case of a hand H2m in FIG. 11), the calculation circuit 115 sets "$\alpha=\beta=0$" in the above equation (1) and considers the distance D to be "0". In this case, the display circuit 111 displays the frame image A2 to be superimposed on the captured image Wp in the fourth display manner (for example, in yellow) and displays the warning image R1 near the frame image A2.

As a second example, if the detected other hand is included only in the first area AR1 (in a case of a hand H2j in FIG. 11), the calculation circuit 115 sets "$\alpha<\beta$" or "$\alpha>0$ and $\beta=0$" in the above equation (1).

As a third example, if the detected other hand is included only in the second area AR2 (in a case of a hand H2k in FIG. 11), the calculation circuit 115 sets "$\alpha>\beta$" or "$\beta>0$ and $\alpha=0$" in the above equation (1).

As a fourth example, if the detected other hand is not included in either the first area AR1 or the second area AR2 (in a case of a hand H2h in FIG. 11), the calculation circuit 115 sets "$\alpha=\beta$" in the above equation (1).

Thus, as illustrated in the second example, if the other hand is in the same height range as the operation frame image A11, the distance is set slightly shortly regardless of proximity in the horizontal direction, and thus, even if the other hand rises only to the same height as the operation-side hand, such a hand can be easily selected as a target for attention.

The hand opposite to the operation-side hand often appears in the range illustrated in the second example and the fourth example, and in addition thereto, a hand and the like of a person (passerby) passing behind the operator may be detected, and such a hand and the like also appear in the ranges illustrated in the first examples and the third example. Unlike in the former, in the latter, the movement is detected regardless of the operator's intention, and thus, it is difficult to isolate the hand itself from the operation frame image A11, but on the other hand, when an excessively large gesture is performed in the operation, the operation-side hand tends to protrude in the case (the first example and the third example) where the hand moves toward the outside of the body. Thus, in particular, in the first example, when the distance D is set to "0" even outside the operation area, it is possible to apply a warning to the operator so that the operation-side hand does not approach too closely the other hand and protrudes from the operation frame image A11 as a result of the excessively large gesture being performed.

It is noted that in determining an initial value when the tracking of the hand starts, even if a hand that satisfies the conditions as the initial value for the tracking is discovered, the controller 11 may control so that the tracking does not start when the other hand is detected within a predetermined distance and apply the warning according to the distance measured at that time.

As described above, according to the display apparatus 1 in the third embodiment, for the gesture operation performed with the hand being held at a certain height, the other hand is basically lowered, and thus, even if the other hand does not approach very closely in the horizontal direction, it is possible to apply a warning when the hand approaches the operation area (operation frame image A11) in the height direction. There is a high possibility that the hand detected outside as seen from the operator belongs to a person different from such an operator and it is not possible to isolate such a hand itself, but in that case, when a warning stronger than usual is applied, it is possible to apply the warning to the operator so that the operation-side hand does not protrude as a result of an excessively large gesture.

According to the present disclosure, it is possible to make it more accessible to introduce a system for executing a gesture recognition while capturing a whole of an operator with a camera from a device to be operated, and thus, it is possible to realize a non-contact UI with an inexpensive monocular camera without separately providing an expensive detection system.

The camera itself does not require a special function or specification, and is usable whether the camera is built into or connected to a device, and there is no need to limit to a standing position as long as the user is within a range where it is possible to detect the hand from the captured image, and therefore, it is possible to cover a wider range with a relatively small-scaled system configuration as compare to a device for a local detection only.

Another method of realizing a non-contact operation by a hand movement includes, for example, a stationary detection device, a wearable device, and a stereo camera.

It is possible to apply the present disclosure to each of the embodiments described above. The present disclosure is not limited to each of the embodiments described above. The present disclosure may include the configuration of each of the embodiments described above, or may include the configuration of any one embodiment.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An input apparatus for detecting a gesture operation made by a hand of a user to perform input processing on an input position of a display screen, the input apparatus comprising:
   an acquisition circuit that acquires a captured image obtained by capturing an image of the user;
   a detection circuit that detects a first hand of the user from the captured image acquired by the acquisition circuit; and
   a display circuit that displays, on the display screen, notification information corresponding to a distance between the first hand and a second hand of the user, different from the first hand, when the second hand is detected during tracking of the first hand detected by the detection circuit wherein the display circuit further displays, on the display screen:
   the captured image,
   a first image surrounding the first hand to be superimposed on the captured image, and
   a second image surrounding the second hand to be superimposed on the captured image in a first display manner according to the distance.

2. The input apparatus according to claim 1, wherein the display circuit further displays, on the display screen, the first image to be superimposed on the captured image in a second display manner, and displays the second image to be superimposed on the captured image in a third display manner, different from the second display manner, according to the distance.

3. The input apparatus according to claim 2, wherein the first display manner is the same as the third display manner.

4. The input apparatus according to claim 1, wherein the display circuit further displays, on the display screen:
   when the distance is equal to or more than a first threshold value, the second image to be superimposed on the captured image in a second display manner,
   when the distance is equal to or more than a second threshold value and less than the first threshold value, the second image to be superimposed on the captured image in a third display manner, and
   when the distance is less than the second threshold value, the second image to be superimposed on the captured image in a fourth display manner.

5. The input apparatus according to claim 4, wherein the display circuit further displays, on the display screen, when the distance is less than the second threshold value, a warning image near the second image.

6. The input apparatus according to claim 4, wherein the second, third, and fourth display manners are limited forms of the first display manner.

7. The input apparatus according to claim 1, further comprising: a calculation circuit that calculates the distance between the first hand and the second hand, wherein
   the calculation circuit calculates the distance by changing weights of distance components in a horizontal direction and a vertical direction of the first hand and the second hand.

8. An input apparatus for detecting a gesture operation made by a hand of a user to perform input processing on an input position of a display screen, the input apparatus comprising:
   an acquisition circuit that acquires a captured image obtained by capturing an image of the user;
   a detection circuit that detects a first hand of the user from the captured image acquired by the acquisition circuit; and
   a display circuit that displays, on the display screen, notification information corresponding to a distance between the first hand and a second hand of the user, different from the first hand, when the second hand is detected during tracking of the first hand detected by the detection circuit, wherein;
   when an operation area capable of receiving the gesture operation is set in the captured image, the display circuit displays, on the display screen, the notification information according to a first distance between the first hand and the second hand, and according to a second distance between the second hand and the operation area, and
   the display circuit further displays, on the display screen, a second image surrounding the second hand to be superimposed on the captured image, in a display manner according to a shorter of the first distance and the second distance.

9. The input apparatus according to claim 8, wherein the display circuit further displays, on the display screen, a warning image near the second image when the second hand is positioned within the operation area.

10. An input method of detecting a gesture operation made by a hand of a user to perform input processing on an input position of a display screen, the input method comprising:
    acquiring a captured image obtained by capturing an image of the user;
    detecting a first hand of the user from the captured image acquired;
    displaying, on the display screen, notification information corresponding to a distance between the first hand and a second hand of the user, different from the first hand, when the second hand is detected during tracking of the first hand detected; and
    displaying, further on the display screen:
    the captured image,
    a first image surrounding the first hand to be superimposed on the captured image, and
    a second image surrounding the second hand to be superimposed on the captured image in a display manner according to the distance.

* * * * *